Nov. 10, 1931.  H. FORD  1,830,898
BRAKE ROD SUPPORT
Filed April 5. 1930
Fig.1
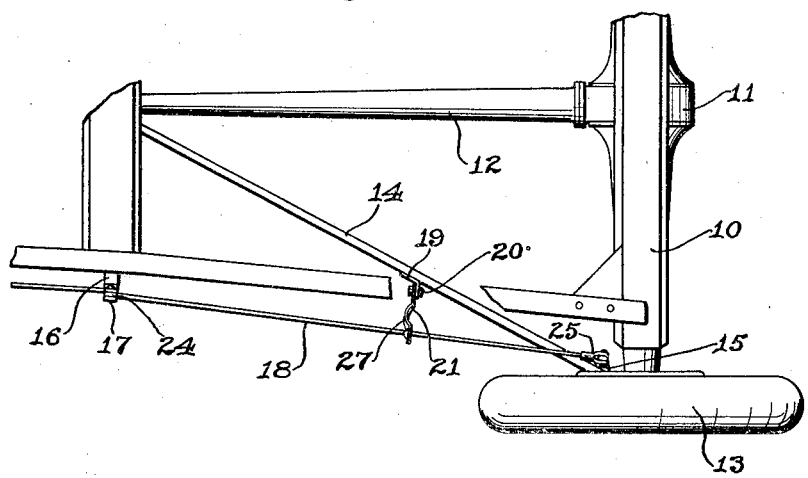
Fig.2
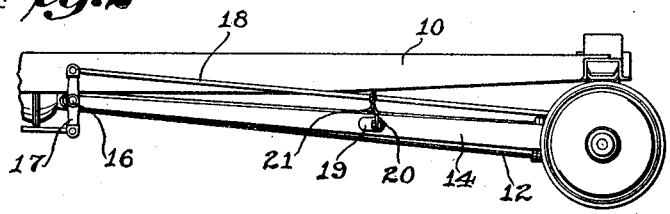
Fig.3
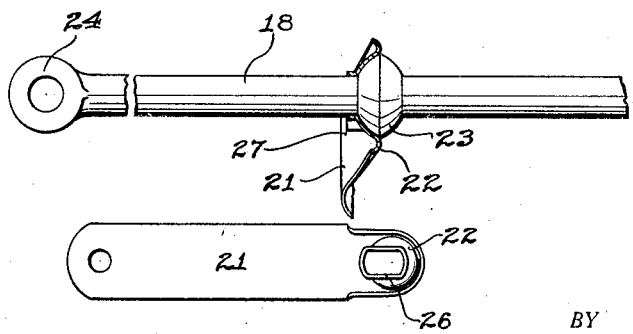
Fig.4
Fig.5
INVENTOR.
Henry Ford
BY
E. L. Davis
ATTORNEY.

Patented Nov. 10, 1931

1,830,898

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

BRAKE ROD SUPPORT

Application filed April 5, 1930. Serial No. 441,914.

The object of this invention is to provide an automobile brake having a simple and inexpensive means for supporting the brake operating rods associated therewith. In the construction of mechanically operated automobile brakes, tension rods are usually provided which extend from each wheel of the car to a center operating cross shaft. When this construction is used, the operating rods are substantially one-half the vehicle wheel base, and being of such length tend to rattle and vibrate due to road shocks and vibration. The device disclosed in this application supports the center portion of such operating rods so that rattle and vibration thereof are eliminated.

A further object of this invention is to provide means for returning such brake operating rods and their associated parts to their inoperative positions when the brakes are released. In the device disclosed herein, I form my brake rod supporting member as a leaf return spring thereby providing a simple and inexpensive structure which takes the place of the conventional brake rod support and coil springs used for returning the brake operating mechanism.

Still a further object of my invention is to provide an improved means for fastening such support to the brake operating rod so that rattle between the parts will be prevented and the device can be easily dismantled and assembled.

With these and other objects in view my invention consists in the arrangement, construction, and combination of the various parts of my improved device, as described in the specification, claimed in my claims, and illustrated in the accompanying drawings, in which:

Figure 1 shows a plan view of the rear quarter of an automobile chassis having my improved device installed thereon.

Figure 2 shows a side elevation of that portion of the chassis shown in Figure 1.

Figure 3 shows a section of a brake rod before being deformed to co-act with my improved return spring and brake rod supporting device.

Figure 4 shows a view of my improved brake rod showing a boss member formed thereon co-acting with the supporting device, and Figure 5 shows a plan view of my combined return spring and brake rod supporting member.

Referring to the accompanying drawings, I have used the reference numeral 10 to indicate generally a frame member associated with an automobile having a rear axle 11, torque tube 12, and rear wheels 13. A pair of rear radius rods 14 connect the outer ends of the axle 11 with the forward end of the torque tube in the conventional manner. These rear wheels are provided with mechanically operated brakes having an operating lever 15 extending therefrom. A brake operating cross shaft 16 is rotatably mounted transversely beneath the center portion of the frame 10 and is provided with beams 17 secured to each outer end.

I have in the drawings shown means for operating a four wheel brake, but it may be well to mention that this device is adapted for all mechanically operated brakes having relatively long brake operating rods, the brakes being either of the two or four wheel type. Brake operating rods 18 connect the levers 15 with the upper ends of the beams 17 and similar rods connect the front wheel brakes with the lower ends of these beams. When the shaft 16 is rotated both sets of brakes are thus applied.

These rods are subject only to tension strains so that they may be made having a relatively small diameter. However, when such small diameter rods are provided the center portion thereof whip, due to road shocks and engine vibrations, and set up an annoying rattle in the car. Means are herewith provided for preventing this whipping action, and for resiliently returning the rods to their inoperative positions.

An L shaped bracket 19 is secured to the radius rod 14 adjacent to the center portion of the brake rod 18 by rivets or by spot welding. The extending ear of this bracket is provided with an opening therethrough which receives a bolt 20 thus securing a supporting member 21 thereto. This member 21 is preferably formed from flat spring steel and is provided with a concave recess 22 sunk in its outer end. The center portion of this member is bowed at 27 to add resiliency thereto.

The section of the brake rod 18 adjacent to the member 21 is enlarged by a swedging process which consists in clamping a rod, as shown in Figure 3, in a pair of dies having opposed concave recesses therein, and then forcing said dies together. A convex boss 23 is thereby formed on the rod which co-acts with the concave recess in the support 21 to form a non-rattling joint therebetween.

In the device here shown, the forward end of the rod 18 is provided with an eye 24 by which it is secured to the upper end of the beam 17, while the rear end of this rod 18 is threaded to receive a clevis 25 by which it is secured to the lever 15. An elongated opening 26 is formed in the bottom of the recess 22 of such proportions that the eye 24 may be assembled therethrough. The boss 23 forms an annular projection around the rod 18 which cannot pass through the opening 26 so that this boss 23 seats in the socket 22. The position of mounting the support 21 is such that it will always be under a bending stress which will urge the rod 18 rearwardly to its inoperative position.

Among the many advantages arising from the use of my improved device it may be well to mention that I have provided a simple and inexpensive leaf spring which returns the brake rods to their inoperative positions while supporting the center portions thereof against whipping, and which co-acts with the brake rod to form a rattle proof joint therebetween.

Some changes may be made in the arrangement, construction, and combination of the various parts of my improved device without departing from the spirit of my invention, and it is my intention to cover by my claims, such changes as may reasonably be included within the scope thereof.

I claim as my invention:

1. In a vehicle brake, a chassis, a longitudinally extending brake operating rod, a boss formed on substantially the center portion of said rod, and a leaf spring extending from said chassis co-acting with said boss to support the center portion of said rod and return it to its inoperative position.

2. In a vehicle brake, a radius rod, a longitudinally extending brake operating rod, an annular boss formed on substantially the center portion of said rod, and a leaf spring extending from said radius rod co-acting with said boss to support said rod and return it to its inoperative position.

3. In a device of the character described, a brake operating rod having an eye formed on one end thereof and a boss formed on its center portion, and a leaf spring having a socket arranged to co-act with said boss and having an opening in said socket through which said eye may be assembled for the purpose described.

4. In a device of the character described, a brake operating rod having an eye formed on one end thereof and an annular boss formed on its center portion, a chassis, and a leaf spring secured to said chassis having a socket formed therein co-acting with said boss and having an elongated opening in said socket through which said eye may be assembled for the purpose described.

HENRY FORD.